(12) United States Patent
Profendiner

(10) Patent No.: US 11,792,625 B2
(45) Date of Patent: Oct. 17, 2023

(54) METHOD FOR OPERATING A VIRTUAL-REALITY OUTPUT DEVICE, SYNCHRONISATION UNIT MOTOR VEHICLE

(71) Applicant: AUDI AG, Ingolstadt (DE)

(72) Inventor: Daniel Profendiner, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 399 days.

(21) Appl. No.: 17/279,859

(22) PCT Filed: May 21, 2019

(86) PCT No.: PCT/EP2019/063017
§ 371 (c)(1),
(2) Date: Mar. 25, 2021

(87) PCT Pub. No.: WO2020/108803
PCT Pub. Date: Jun. 4, 2020

(65) Prior Publication Data
US 2022/0034677 A1    Feb. 3, 2022

(30) Foreign Application Priority Data

Nov. 30, 2018   (DE) .................... 10 2018 220 685.6

(51) Int. Cl.
*H04W 4/46*     (2018.01)
*A63F 13/216*   (2014.01)
(Continued)

(52) U.S. Cl.
CPC ............. *H04W 4/46* (2018.02); *A63F 13/216* (2014.09); *A63F 13/65* (2014.09); *G06T 19/006* (2013.01)

(58) Field of Classification Search
CPC ........ H04W 4/46; A63F 13/216; A63F 13/65; A63F 2300/8082; A63F 13/795; G06T 19/006; G01C 21/26
See application file for complete search history.

(56) References Cited

U.S. PATENT DOCUMENTS 7,158,879 B2    1/2007  Tsuge
10,295,361 B2*  5/2019  Lei ..................... G01C 21/3676
(Continued)

FOREIGN PATENT DOCUMENTS

DE  10 2010 043 310 A1   5/2012
DE  10 2014 214 514 A1   1/2016
(Continued)

OTHER PUBLICATIONS

International Search Report (Forms PCT/ISA/210, PCT/ISA/220, and PCT/ISA/237), dated Sep. 11, 2019, in International Patent Application No. PCT/EP2019/063017 (15 pages including translation).

(Continued)

*Primary Examiner* — Motilewa Good-Johnson
(74) *Attorney, Agent, or Firm* — STAAS & HALSEY LLP

(57) ABSTRACT

A planned navigation route of a first motor vehicle is established as a reference navigation route. A second motor vehicle having a planned navigation route which satisfies a prespecified synchronization condition is selected, and a route length of the navigation route of the second motor vehicle is scaled to a route length of the reference navigation route. A route section of the reference navigation route is identified as a synchronizable route section, the route section satisfying a prespecified homogeneity criterion, and a route section of the scaled navigation route is assigned to the synchronizable route section. When the first motor vehicle is on the synchronizable route section and when the second (Continued)

motor vehicle is on the route section of the scaled navigation route assigned to the synchronizable route section, the provided output content which describes an avatar for the second motor vehicle is changed.

17 Claims, 5 Drawing Sheets

(51) Int. Cl.
*G06T 19/00* (2011.01)
*A63F 13/65* (2014.01)

(56) References Cited

U.S. PATENT DOCUMENTS

| | | | | |
|---|---|---|---|---|
| 2005/0137792 | A1* | 6/2005 | Tsuge | G01C 21/3492 |
| | | | | 340/995.13 |
| 2014/0295963 | A1* | 10/2014 | Ishikawa | A63F 13/216 |
| | | | | 463/31 |
| 2018/0283885 | A1 | 10/2018 | Peterson et al. | |
| 2019/0204096 | A1 | 7/2019 | Cai et al. | |
| 2019/0212167 | A1* | 7/2019 | Yamada | G01C 21/3602 |
| 2019/0250007 | A1* | 8/2019 | Su | G01C 21/3676 |
| 2020/0173796 | A1* | 6/2020 | Beaurepaire | G01C 21/3415 |

FOREIGN PATENT DOCUMENTS

| | | |
|---|---|---|
| DE | 10 2014 111 386 A1 | 2/2016 |
| DE | 10 2015 004 749 A1 | 10/2016 |
| DE | 10 2016 104 337 A1 | 9/2017 |
| WO | 2017/166591 A1 | 10/2017 |

OTHER PUBLICATIONS

Notification of the International Preliminary Report on Patentability (Form PCT/IPEA/409, Form PCT/IPEA/416), dated Jan. 8, 2020, in International Patent Application No. PCT/EP2019/063017, including Transmittal Letter and Amended Claims (32 pages including translation).

Examination Report dated Sep. 30, 2019, in German Patent Application No. 10 2018 220 685.6 (16 pages).

International Patent Application No. PCT/EP2019/063017, May 21, 2019, Daniel Profendiner, Audi AG.

German Patent Application No. 10 2018 220 685.6, Nov. 30, 2018, Daniel Profendiner, Augi AG.

International Preliminary Report on Patentability dated Jun. 10, 2021, in International Patent Application No. PCT/EP2019/063017, 6 pages.

* cited by examiner

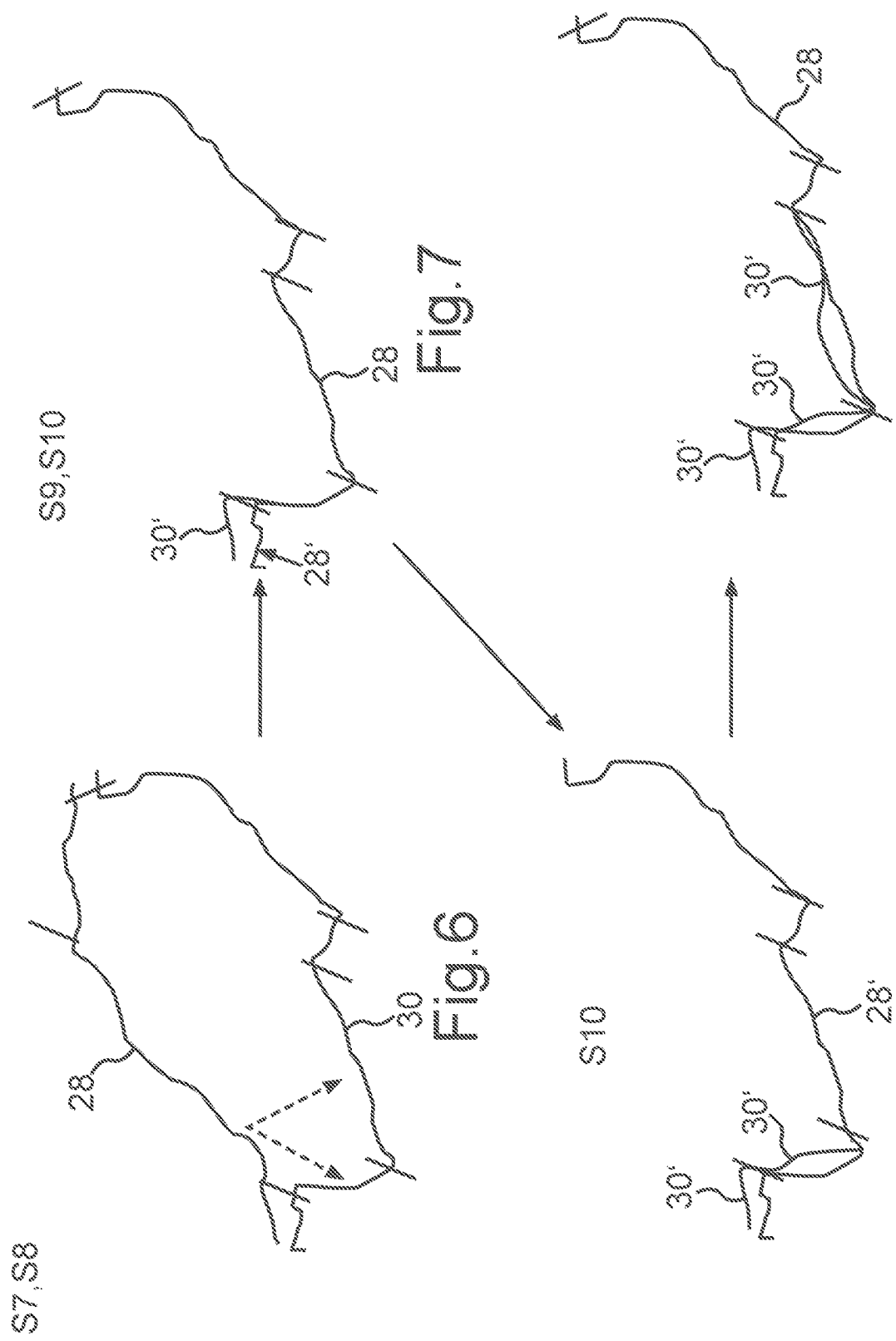

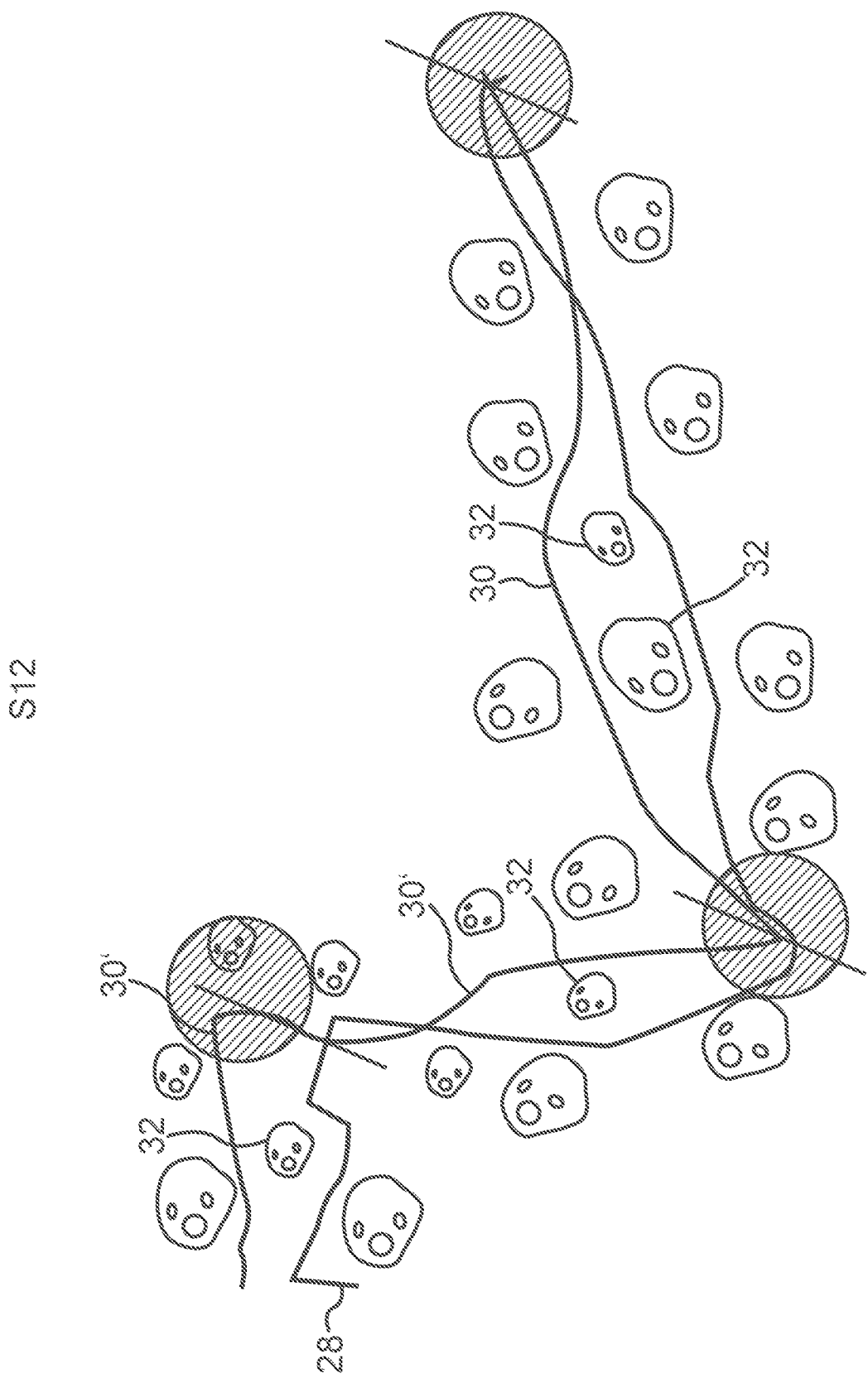

METHOD FOR OPERATING A VIRTUAL-REALITY OUTPUT DEVICE, SYNCHRONISATION UNIT MOTOR VEHICLE

CROSS-REFERENCE TO RELATED APPLICATIONS

This application is a U.S. national stage of International Application No. PCT/EP2019/063017, filed on May 21, 2019. The International Application claims the priority benefit of German Application No. 10 2018 220 685.6 filed on Nov. 30, 2018. Both the International Application and the German Application are incorporated by reference herein in their entirety.

BACKGROUND

Described herein are methods for operating a virtual reality output apparatus (device) which is assigned to a first motor vehicle. A virtual reality output apparatus is understood to mean an output device for creating a virtual reality and in this way create a sense of immersion. In this case, the output device can create and/or provide a virtual reality, and be embodied for example as virtual reality glasses ("VR glasses"), shutter glasses, data glasses, or a head-mounted display.

Systems for using a virtual reality ("VR") in a vehicle are known in order to reduce motion sickness in a highly immersive entertainment system in the vehicle. Motion sickness can occur when for example a movement of the real vehicle does not correspond to a virtual reality driving movement.

However, it is necessary to tackle unique challenges in order to provide application options in which several players can play together, so-called multiplayer use cases. The movement of a virtual vehicle corresponds to the movement of the real vehicle with reference to the real road which is represented by a navigation route of the vehicle. Therefore, the players have to sit in the same vehicle.

German Patent Application No. 10 2016 104 337 A1 describes a method for position determination and a method for orientation of at least one virtual reality headset in amusement rides.

German Patent Application No. 10 2014 111 386 A1 describes a method for operating an amusement ride, in particular a rollercoaster, in which a virtual reality which corresponds to travel with the vehicle is created by use of an amusement ride-specific computer program and is displayed on a head-mounted display, which is assigned to the passenger of a vehicle, depending on the position of the vehicle on the driving route and depending on the position and/or the orientation of the head-mounted display.

German Patent Application No. 10 2015 004 749 A1 describes a method for operating virtual reality glasses, in which respective observation positions corresponding to a continuously recorded position of the virtual reality glasses are prespecified.

The related art describes either the technical principles of virtual reality glasses for an individual player or a common immersive experience in a rollercoaster car. However, the related art does not provide a solution for several players who would like to share the same virtual reality but are in transit in different vehicles. For example, in cases in which different vehicles have different destinations, that is to say are in transit on different navigation routes, the related art does not provide a solution for reducing a probability of becoming motion sick.

SUMMARY

One or more aspects of the disclosure are based on providing a system and a method for synchronizing a virtual reality for several users of a virtual reality system who are in transit in different motor vehicles.

The one or more aspects may be achieved by features of the method described herein and the apparatuses described herein. Advantageous developments are further described herein.

One or more aspects of the disclosure are based on the idea of transforming the navigation routes of the two vehicles, or the representation of the navigation routes in the virtual reality, such that they represent compatible trajectories. This allows application options in which several players who are distributed between several vehicles can use the same virtual reality system. This also works for players who are not traveling on the same navigation routes in their motor vehicles. In order to implement cooperative multiplayer experiences, movements of different vehicles are "synchronized" or adapted, so that the vehicles "see" in the virtual reality and contest for example a game level together.

The method described herein for operating a virtual reality output apparatus which is assigned to a first motor vehicle, for example is coupled to a first motor vehicle, includes the following method operations which are carried out by a synchronization device. Here, a synchronization device is understood to mean a device, a device component or a device system which is configured to provide the virtual reality and to this end can receive and evaluate signals and also can provide for example an output file and/or an output signal based on these signals. The synchronization device can for example be a component of the virtual reality output apparatus and/or of the motor vehicle.

Firstly, a planned navigation route of the first motor vehicle, which is referred to as the reference navigation route in the text which follows, is established. The planned navigation route can be established for example by checking an activated or stored navigation route of a navigation device.

A second motor vehicle and/or a second virtual reality output apparatus, which is assigned to the second motor vehicle, for example is coupled to the second motor vehicle, is defined. The second motor vehicle is defined depending on whether a planned navigation route of the second motor vehicle satisfies a prespecified synchronization condition. In preparation for this, for example a corresponding item of information relating to a navigation route of the second motor vehicle can be carried out via an Internet connection or a motor vehicle-to-motor vehicle communication link.

The synchronization condition prespecifies that a duration of travel of the second motor vehicle on its navigation route lies within a prespecified tolerance range around a reference journey duration of travel of the first motor vehicle on the reference navigation route. By way of example, the reference journey duration, that is to say the predicted duration of travel of the first motor vehicle on the reference navigation route, can be ascertained on the basis of the navigation route of the first motor vehicle or a corresponding item of information can be called up from the navigation device. The tolerance range can be prespecified depending on the reference journey duration and describe for example a journey duration of travel which is for example five minutes shorter than the reference journey duration up to a journey duration which lasts five minutes longer than the reference journey duration. In other words, the prespecified tolerance range can include the reference journey duration, that is to say the duration of the journey of the first motor vehicle. If the prespecified tolerance range also includes the duration of travel of the second motor vehicle on its navigation route, the prespecified synchronization condition is satisfied.

Defining the second motor vehicle, which satisfies the prespecified synchronization condition, can also be referred to as "matchmaking".

In order to check that the prespecified synchronization condition is satisfied, the synchronization device can therefore establish or calculate for example the duration for travel of the second motor vehicle on its navigation route and compare this with the prespecified tolerance range.

The synchronization device scales a route length of the navigation route of the second motor vehicle to a route length of the reference navigation route. In this case, a route length is understood to mean a path length which can be prespecified for example in kilometers. Therefore, the scaling operation includes, in other words, matching an actual route length of the navigation route of the second motor vehicle to an actual route length of the reference navigation route, that is to say the navigation route of the first motor vehicle. By way of example, the reference navigation route, that is to say the navigation route of the first motor vehicle, can describe travel on a freeway, while the navigation route of the second motor vehicle can lie within the prespecified tolerance range, but can describe a navigation route on mainly country roads and therefore be a great deal shorter than the reference navigation route with respect to the route length or path length.

The synchronization device defines at least one synchronizable route section of the reference navigation route, wherein the route section satisfies a prespecified homogeneity criterion. The prespecified homogeneity criterion prespecifies a prespecified minimum degree of correspondence of a route profile of the route section of the reference navigation route with a route profile of a route section of the scaled navigation route. In other words, the prespecified homogeneity criterion for the route section of the reference navigation route is satisfied if a route section of the navigation route of the second motor vehicle has a route section of which the route profile corresponds for example by at least 80% to the route profile of the route section of the reference navigation route. In this case, a route profile is understood to mean a direction of the route section, that is to say for example a bend to the left followed by a straight profile with a length of 500 meters which can then be followed for example by a bend to the right.

The route section of the scaled navigation route is assigned to the synchronizable route section, that is to say to the route section of the reference navigation route that satisfies the prespecified homogeneity criterion. When the route section of the scaled navigation routes is assigned to the synchronizable route section, pairs of route sections are thereby established or formed.

The operation of assigning the route section of the scaled navigation route to the synchronizable route section can include for example subdividing the navigation routes into sections, "cutting" the scaled navigation route and adapting to the reference navigation route in route sections. In this case, several route section pairs can ideally be ascertained. In this way, the two navigation routes can be mapped onto equivalent sections. In other words, mapping onto the route profile of the navigation route of the first motor vehicle can take place. The second motor vehicle can therefore be moved to a comparable position with respect to the entire route, that is to say with respect to the reference navigation route, during travel.

In other words, the navigation routes are "cut up" or divided into identical or similar portions, that is to say route sections. The virtual reality is then provided as a common world which is based on the various navigation routes. The players feel as though the respectively other players are traveling on the same virtual route (and therefore the same real route), that is to say are traveling in the same virtual world.

An output content, which describes a virtual journey on a virtual navigation route, which virtual journey represents the reference journey duration and the route profile of the reference navigation route, is provided. The output content can for example be provided for output by the virtual reality output apparatus during travel of the first motor vehicle, for example in the form of an output file. The output content can be for example a VR game in which an ego vehicle, for example a spaceship, moves through space, wherein the navigation route of the ego vehicle can have the same route profile as the reference navigation route.

If the first motor vehicle is on a synchronizable route section and the second motor vehicle is on that route section of the scaled navigation route which is assigned to the synchronizable route section, there is a change in the provided output content, wherein the changed output content describes an avatar which represents the second motor vehicle and a recorded motor vehicle movement of the second motor vehicle. An avatar of the second motor vehicle is understood to mean a computer animation or other type of virtual representation of the second motor vehicle. In other words, the output content shows a representation of the second motor vehicle, for example a second spaceship which can be seen from the view of the ego motor vehicle, which executes the same movements as the second motor vehicle is currently executing on the real navigation route of the second motor vehicle.

The abovementioned advantages result. Vehicle movements of the second motor vehicle are imaged onto a navigation route of the first motor vehicle, that is to say the motor vehicle of the user of the virtual reality output apparatus, by the method described herein. In other words, the output content which describes the virtual reality for a user of the first motor vehicle is changed or provided to the effect that the output content describes a content in which the other, that is to say the second, motor vehicle is in transit on the virtual navigation route of the output content. In other words, a virtual reality is provided, which virtual reality shows the real traveling movements of a second motor vehicle, in which the second player is located, matched to the traveling movement of the first motor vehicle. In other words, a navigation route of another player in another motor vehicle, which is on another navigation route, is imaged onto a virtual reality of the first player in the first motor vehicle. This considerably prevents disorientation because the movements of the incorporated representation of the second motor vehicle in the virtual reality is synchronized with the movement of the ego motor vehicle which represents the first motor vehicle. A coherent experience for several players is advantageously rendered possible, wherein the players can be located in different motor vehicles and even on different navigation routes. As a result, two worlds are harmonized. The method can ideally also be rendered possible for the second player, so that both users who are located in different motor vehicles are in one and the same harmonized virtual reality.

In order to check whether the first motor vehicle is on the synchronizable route section or whether the second motor vehicle is on that route section of the scaled navigation route which is assigned to the synchronizable route section, the synchronization device can optionally establish a current position of the first motor vehicle on the reference navigation route and/or establish a current position of the second motor vehicle on its navigation route. In addition, the synchronization device can optionally record a motor vehicle movement of the second motor vehicle, and optionally likewise record a motor vehicle movement of the first motor vehicle.

During or after the assignment of the route section of the scaled navigation route to the synchronizable route section, a sequence of route sections of the reference navigation route and/or of the navigation route of the second motor vehicle can advantageously be established. A respective route section sequence can be observed during the assignment of the route sections to form route section pairs.

The method can for example include the synchronization device being able to generate an output signal which can describe the changed output content. The synchronization device can transmit the generated output signal to the virtual reality output apparatus, so that the virtual reality output apparatus can receive and output the generated output signal.

The at least one synchronizable route section can ideally be defined to the effect that several synchronizable route sections can be defined, wherein a sequence or order of the route sections of the scaled navigation route that are assigned to the respective synchronizable route sections can correspond to a sequence of the route sections of the reference navigation route. In other words, not only one pair of route sections which have been mapped onto one another but rather several such pairs of route sections are formed. As a result, the virtual reality experience becomes more immersive since a large number of adapted route sections of the two navigation routes improves a consistency of the common experience and the common immersion.

The scaling and/or the defining of the at least one route section can ideally be carried out before the beginning of travel of the first motor vehicle, optionally additionally before the beginning of travel of the second motor vehicle. Therefore, the common experience begins as early as when travel begins.

In order to improve the experience of both players by way of reacting to situation-specific changes during travel of one or both of the motor vehicles, establishing a change in speed of the first motor vehicle and/or establishing a speed of the second motor vehicle can take place according to a further embodiment of the method described herein. The speed may for example be a current speed in each case. This operation can be carried out by the synchronization device. If for example the second motor vehicle suddenly finds itself in a traffic jam, the slower progress of the motor vehicle can be incorporated into the virtual reality. According to this embodiment, the scaling of the navigation route of the second motor vehicle takes place in the event of, and depending on, the established change in speed. In other words, the scaling of the navigation route of the second motor vehicle is dynamic.

An embodiment of the method in which the synchronizable route section does not exhibit any change in direction and/or does not exhibit a bend may be highly suitable for mapping route sections.

The prespecified homogeneity criterion can for example describe a limit value for a degree of bending of the navigation routes; and/or a limit value for a distance of route profiles of the navigation routes that are placed one over the other from one another.

According to a further embodiment of the method described herein, the synchronization device, if it establishes that the first motor vehicle is not on a synchronizable route section, can change the provided output content to the effect wherein the changed output content can describe, instead of the avatar, a display object which appears to be static or move independently of the recorded motor vehicle movement of the second motor vehicle. In other words, the virtual environment of the virtual navigation route is filled with one object or several objects which represent a visual separation, so that the user of the VR output apparatus does not expect to see the representation, that is to say the avatar, of the second motor vehicle. The avatar is then blanked out in other words. The user of the virtual reality output apparatus therefore does not see the avatar of the second motor vehicle, this advantageously being expressed in the situation in which the first motor vehicle is on a non-synchronizable route section since the second motor vehicle highly probably executes specifically a motor vehicle movement which is not matched to the motor vehicle movement of the first motor vehicle and therefore not to a movement of the ego motor vehicle. As a result, disorientation of the user of the virtual reality output apparatus is considerably reduced or even entirely prevented.

In other words, the avatar of the second motor vehicle is not incorporated when the second motor vehicle is on a route section which has a different route profile to that route profile which the second motor vehicle is on. The user of the first motor vehicle is therefore not disorientated by way of seeing a representation of the second motor vehicle which makes movements which do not match its virtual navigation route.

The synchronization device can for example additionally carry out the method described herein for a second virtual reality output apparatus which is assigned to the second motor vehicle. The navigation route of the second motor vehicle can then be the reference navigation route, and the navigation route of the first motor vehicle can then be subdivided into route sections which are adapted to route sections of this reference navigation route. In other words, the method described herein can be carried out for the virtual reality output apparatus of the second motor vehicle in an analogous manner.

One or more aspects of the disclosure described herein may be achieved by a synchronization device which is designed to carry out one or more of the above-described embodiments of the method described herein. The synchronization device can be configured for example as a control chip or control printed circuit board of the motor vehicle or of the virtual reality output apparatus or of a data server which is external to the motor vehicle. The synchronization device can for example have a processor device, that is to say a device or a device component for electronic data processing, which can have at least one microcontroller and/or at least one microprocessor. A program code which, when executed by the processor device, prompts the synchronization device to carry out one or more of the embodiments of the method described herein, can be stored in a data memory, for example a data memory of the synchronization device.

One or more aspects of the disclosure described herein may be achieved by a motor vehicle which includes one or more of the embodiments of the synchronization device described herein. The motor vehicle can for example be configured as a motor car, for example as a passenger car. The abovementioned advantages result.

Also described herein are developments of the motor vehicle described herein and the synchronization device described herein, which developments have features as have already been described in connection with the developments of the method described herein. For this reason, the corresponding developments are not described again here.

One or more aspects of the disclosure described herein may also be achieved by a virtual reality output apparatus which includes one or more of the embodiments of the synchronization device described herein.

One or more aspects of the disclosure described herein may also be achieved by an online data server device which has an embodiment of the synchronization device described herein.

The method described herein can also be referred to as a computer-implemented method or as a method which can be executed by a computer.

One or more aspects of the disclosure described herein may be achieved by an apparatus and/or a system for data processing, including features for executing the embodiments of the method described herein. One or more aspects of the disclosure described herein may be achieved by a computer program product, including instructions which, when the program is executed by a computer, prompt the computer to execute one or more of the embodiments of the method described herein. One or more aspects of the disclosure described herein may be achieved by a computer-readable storage medium, including instructions which, when executed by a computer, prompt the computer to execute one or more of the embodiments of the method described herein.

The disclosure also includes the combinations of the features of the described embodiments.

BRIEF DESCRIPTION OF THE DRAWINGS

These and other aspects and advantages will become more apparent and more readily appreciated from the following description of example embodiments, taken in conjunction with the accompanying drawings, of which:

FIG. 6 is a further schematic illustration of the example embodiment;

FIG. 7 is a further schematic illustration of the example embodiment;

FIG. 8 is a further schematic illustration of the example embodiment;

FIG. 9 is a further schematic illustration of the example embodiment;

FIG. 11 is a further schematic illustration of the example embodiment.

DETAILED DESCRIPTION

Figure 1:
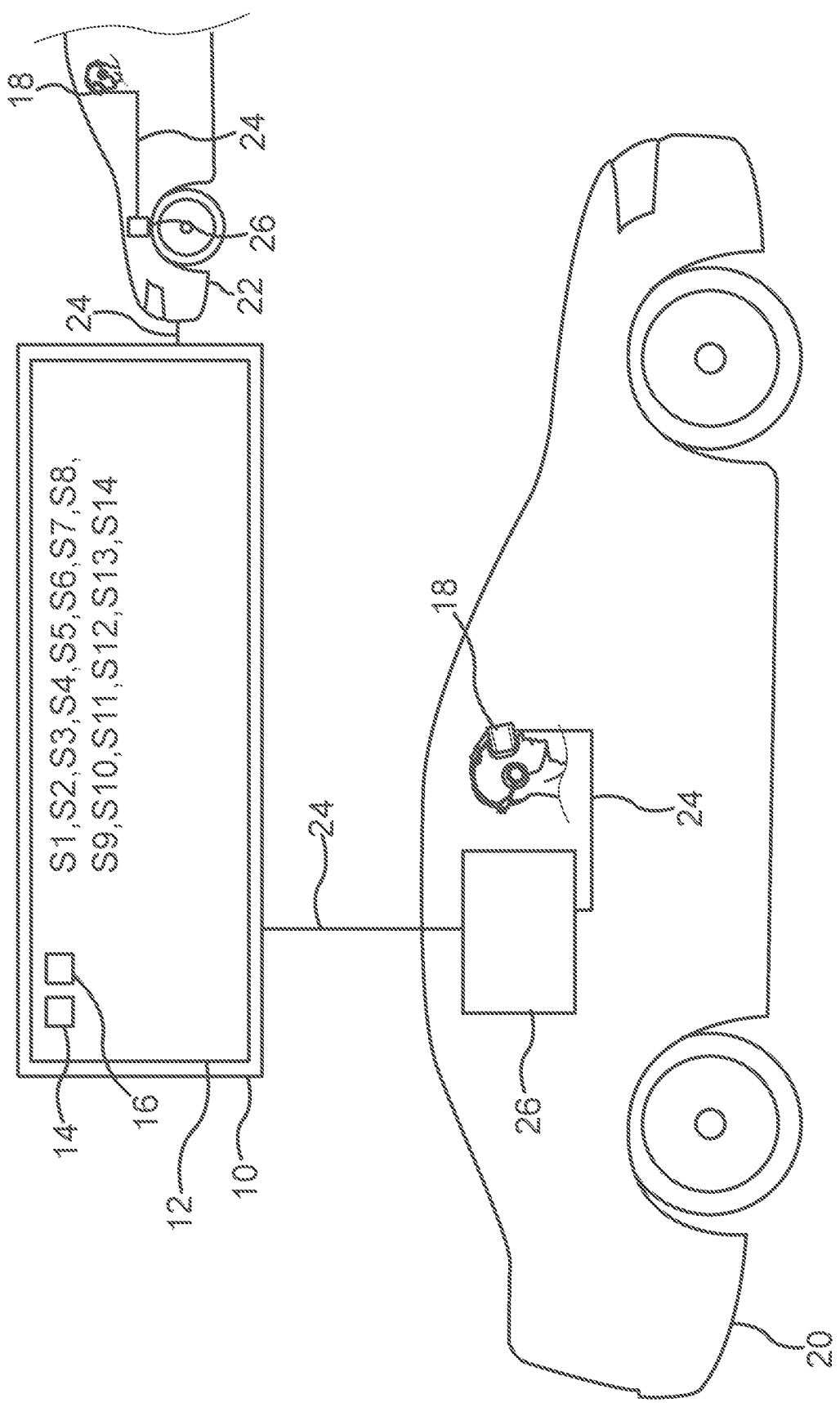
FIG. 1 is a schematic illustration of an example embodiment of the method described herein.

The example embodiments explained below are merely examples. In the example embodiments, the components of the embodiment which are described are each individual features that can be viewed independently of one another and that each also develop the disclosure independently of one another. Therefore, the disclosure should also include combinations of the features of the embodiments other than those shown. Furthermore, the described embodiments can also be augmented by further features which have already been or are to be described.

Reference will now be made in detail to examples which are illustrated in the accompanying drawings. In the drawings, elements having the same function are each denoted by the same reference symbols.

FIG. 1 illustrates the principle of the method described herein and the apparatuses described herein on the basis of a first example embodiment.

In this respect, FIG. 1 shows, by way of example, a data server device 10 which is external to the motor vehicle and can have a synchronization device 12 in the example of FIG. 1. The data server device 10 can be configured for example as a data cloud, data server or backend.

The synchronization device 12 can have for example a processor device 14 with a plurality of microprocessors and/or a data memory 16 in which a program code for carrying out the method described herein can be stored. As an alternative to the example shown in FIG. 1, the synchronization device 12 can be a structural element or a component of a virtual reality output apparatus 18 which can be configured for example as shutter glasses or a head-mounted VR display and can be used by a passenger. In a further alternative, the synchronization device 12 can be a component of a motor vehicle 20.

The example of FIG. 1 shows a first motor vehicle 20 which is intended to be used for travel on a prespecified navigation route. In the example of FIG. 1, the virtual reality output apparatus 18 can create for example a virtual reality, wherein data which can describe a virtual journey through outer space and the actual movements of the first motor vehicle 20 is output. In this case, the real vehicle movement can be represented for example in the output content of the virtual reality as a movement of a virtual spaceship as the ego vehicle. If it is established for example by navigation data that the first motor vehicle 20 is traveling on a bend, the output content of the virtual reality can describe for example that the virtual spaceship is avoiding an asteroid in accordance with the real vehicle movement.

In the example of FIG. 1, the output content can be for example a game which can be played by several players at the same time. In the example of FIG. 1, a further player can be located for example in a second motor vehicle 22 and have planned travel in the second motor vehicle 22. To this end, the second player can likewise use a virtual reality output apparatus 18. However, since the two players have planned different navigation routes with their motor vehicles 20, 22, the synchronization device 12 can be used to image travel of the second motor vehicle 22 onto the virtual reality which is output to the user of the first motor vehicle 20 by their virtual reality output apparatus 18, and vice versa.

The respective virtual reality output apparatus 18 can be assigned to the respective motor vehicle 20, 22, for example by respective coupling by use of a Bluetooth connection (not shown in FIG. 1). The communication between the synchronization device 12 and the respective virtual reality output apparatus 18 can take place via a customary data communication link 24, for example via an Internet connection, WLAN connection or mobile radio link. For the purpose of data communication, the synchronization device can be configured with a communication module, for example a mobile radio module. A communication device 26 can be provided in each case, wherein a communication device 26 can be a communication device 26 of the respective motor vehicle 20, 22 or of the respective virtual reality output apparatus 18. The communication device 26 can likewise be configured for example as a mobile radio module or have such a mobile radio module. If the respective mobile communication device 26 is for example a component of the respective motor vehicle 20, 22, the communication device 26 can communicate with the virtual reality output apparatus 18 for example via a wired data communication link 24, for example via a cable or a data bus, or via a wireless data communication link 24.

Figure 2:
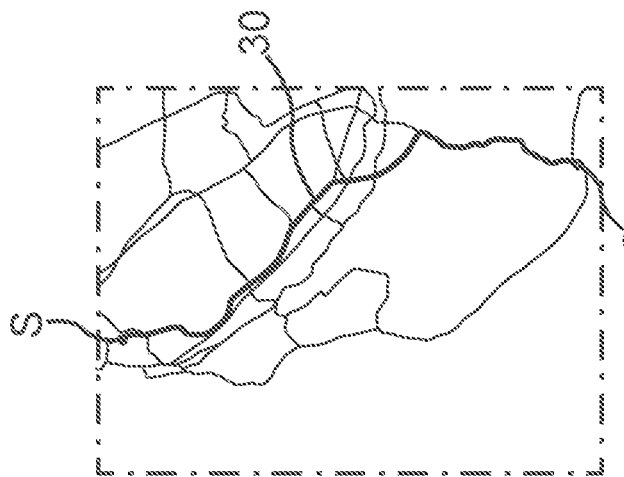
FIG. 2 is a further schematic illustration of the example embodiment.
Figure 3:
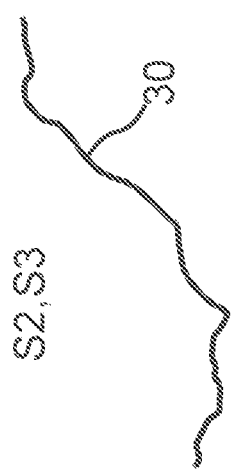
FIG. 3 is a further schematic illustration of the example embodiment.

The method can for example be carried out before the beginning of travel of the motor vehicles 20, 22. In method operation S1, a planned navigation route of the first motor vehicle 20 is initially established as the reference navigation route. To this end, the synchronization device 12 can call up the navigation route for example from a navigation device of the first motor vehicle 20, or the navigation route can be calculated on the basis of journey data, that is to say a start point and a journey destination. FIG. 2 schematically shows the profile of the navigation route 28 of the first motor vehicle 20, the planned journey of which can lead for example from Gaimersheim to Regensburg. In this case, the start point is identified by G in FIG. 2, and the journey destination is identified by R. Here, FIG. 3 shows the reference navigation route 28 in isolation in order to highlight the route profile. In this case, the changes in direction or those route sections in which the navigation route runs without bending or virtually (substantially) without bending can be readily identified from the route profile.

In order to define the second motor vehicle 22, it is for example possible to search through a database, which can be stored for example in the data memory 16, containing a large number of planned or current navigation routes which are stored in the database, and then to check whether a prespecified synchronization condition is satisfied. By way of example, the prespecified synchronization condition can prespecify that the navigation route of a suitable second motor vehicle 22 may be at most five minutes shorter and/or five minutes longer than a journey duration of the reference navigation route 28 with respect to a travel duration. Such a tolerance range can be prespecified for example by a presetting. The length of the reference journey duration of the first motor vehicle 20, that is to say how long the first motor vehicle 20 presumably requires for the journey on the reference navigation route 28, can be defined for example by the synchronization device 12, for example by evaluating the data of the navigation route, or a value of the reference navigation route 28 can be read out, or for example, requested by the navigation device of the motor vehicle 20.

Figure 4:
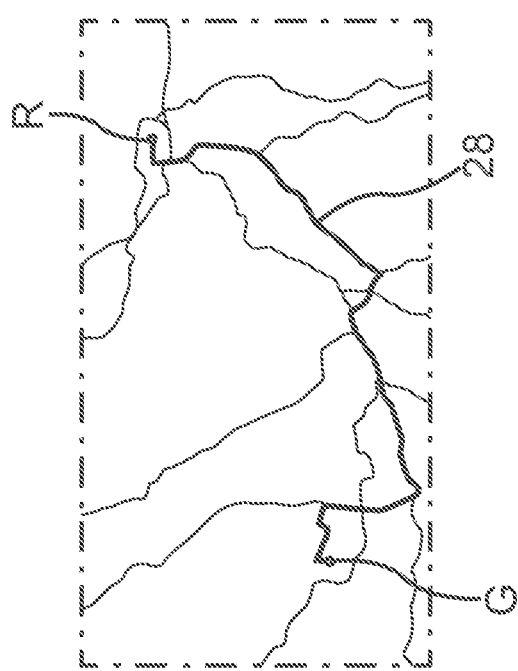
FIG. 4 is a further schematic illustration of the example embodiment.
Figure 5:
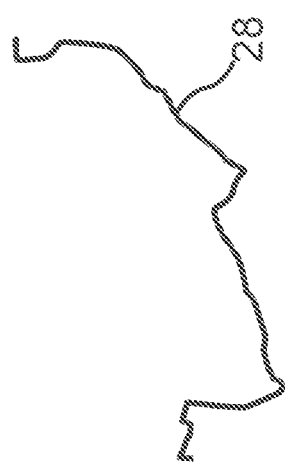
FIG. 5 is a further schematic illustration of the example embodiment.

Checking the stored information relating to navigation routes of a large number of vehicles for the prespecified synchronization condition can give the result for example that the second motor vehicle 22, as shown in FIG. 1, is planning or carrying out a navigation route 30, the journey duration of which lies within the prespecified tolerance range. The navigation route 30 of the second motor vehicle 22 is shown for illustration purposes in FIG. 4, and can lead for example from San Francisco (S) to Santa Cruz (C). The second motor vehicle 22 can therefore be located for example on a different continent to the first motor vehicle 20, but a user of the second motor vehicle 20 can share the virtual world with the driver of the first motor vehicle 20 since their navigation route satisfies the synchronization condition and their motor vehicle 22 is defined as the second motor vehicle 22 in method operation S2. Here, FIG. 5 shows the navigation route 30 of the second motor vehicle 22 once again in isolation in order to highlight the route profile.

This process of defining the second motor vehicle 22 (S2) can also be referred to as "matchmaking". In other words, during matchmaking, a suitable co-player is sought and selected on the basis of a similar route length.

During the scaling of the route length of the navigation route 30 of the second motor vehicle 22 (S3), size scaling is performed on the basis of the reference navigation route 28. In this case, the size scaling is based on a path length or route length. In this case, a scaling factor can be prespecified and can be applied for example to the entire route, or in route sections. To this end, for example several route sections can be defined, as can their order or sequence or progression of the route sections (S4). In other words, during the scaling S3, the navigation route 30 of the second motor vehicle 22 is scaled to the same or a similar distance as the reference navigation route 28.

In method operation S5, at least one route section of the reference navigation route 28 is defined as a synchronizable route section. To this end, a prespecified homogeneity criterion is checked (S6). In other words, homogeneous route sections are sought and found in the reference navigation route 28 and in the navigation route 30 of the second motor vehicle 22, wherein a route section of the reference navigation route 28 and a route section of the navigation route 30 of the second motor vehicle 22 can respectively be assigned to one another. In the example of FIG. 1, the homogeneity criterion can prespecify for example that a respective route profile of the route sections correspond to at least 80 percent. In order to find such route sections, for example as illustrated in FIG. 6, the two navigation routes 28, 30 can be compared with one another and subdivided into sections (S7), as a result of which such route sections can be found (S8). In this case, the route sections can be separated by black bars in the example of FIG. 6 for better illustration. For the purpose of such a comparison, for example map data which can describe the respective navigation route 28, 30 can be compared. A route section of the navigation route 28 and a route section of the navigation route 30 can be for example homogenizable, that is to say synchronizable, when for example the two route sections include sharp serpentines, or for example each include a long straight section.

Provision can be made for the navigation route 30 to be cut or subdivided (S9), wherein FIG. 7 shows a first route section 30' which can be mapped onto an equivalent section. In other words, the first route section of the navigation route 30, the route section 30', can be assigned to a first route section 28' of the reference navigation route 28 (S10). In this case, it is possible to prespecify, depending on which of the two route sections 28', 30' is shorter, when the next "cut" occurs, that is to say when the other navigation route is again subdivided into a new section. During the assignment S10, which can also be referred to as mapping, further route sections can ideally be assigned to corresponding route sections of the reference navigation route 28 (S10). Here, FIG. 8 shows an example adaptation, that is to say an assignment S10 of several route sections 30' of the navigation route 30 to the reference navigation route 28. A continuation of this adaptation is shown in FIG. 9.

During the adaptation process, the reference navigation route 28 can be referred to as a "master", wherein the reference navigation route 28 remains unchanged, that is to say reflects its own route with its own route profile. In other words, during the "cutting" and during the subsequent assignment S10, homogenizable, that is to say corresponding, route sections are matched. If a right-hand bend is provided for example on the reference navigation route of the first player but a left-hand curve is provided for the second player, the route can be "cut", that is to say the route sections can be combined, like components, such that they can fit together within a tolerance range. In this case, for example end points can be marked, which end points can include for example traveling events, for example if one of the navigation routes travels through a tunnel. In this case, provision can be made for example for the avatar of the respectively other motor vehicle 20, 22 to not be able to be "seen" in the changed output content, that is to say to not be incorporated, when traveling on this route section.

The output content can be provided by way of it being made available for example to the data memory 16 (S11). If the synchronization device 12 is for example a synchronization device 12 of the virtual reality output apparatus 18, the output content can be provided (S11) for example by downloading or streaming from the data server device 10.

Figure 10:
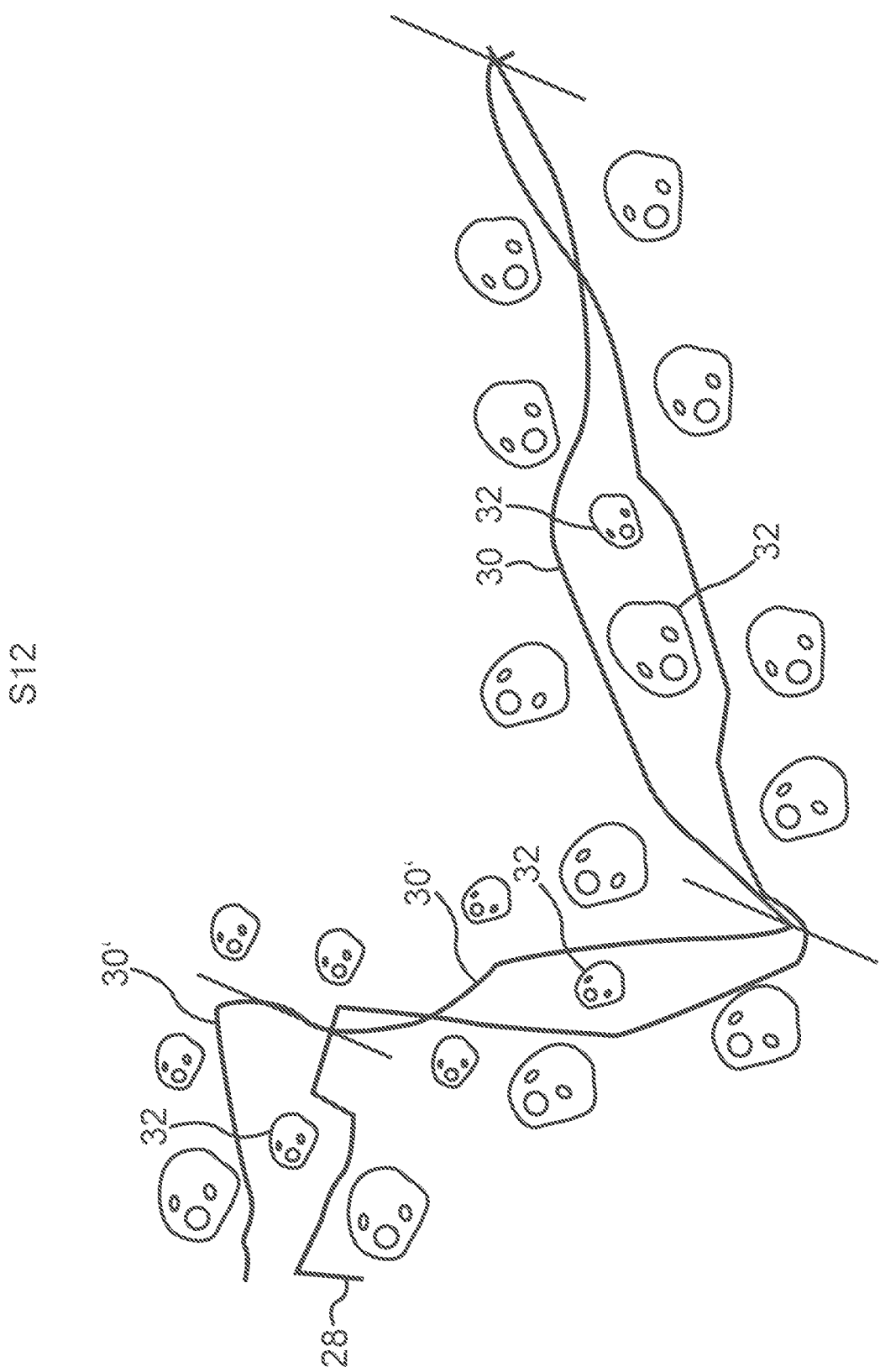
FIG. 10 is a further schematic illustration of the example embodiment.

FIG. 10 shows the "mapped" or adapted route sections 30' of the navigation route 30 of the second motor vehicle 22 that have been adapted to the reference navigation route 28 (S10). FIG. 10 schematically illustrates the output content which can be captured for example by media data. Therefore, depending on the navigation routes 28, 30, a previously preprepared output content can be changed in method operation S12 to the effect that display objects 32 can be incorporated at those points of the virtual navigation route, which corresponds to the reference navigation route 28, at those points at which the real navigation routes 28, 30 differ considerably from one another and cannot be adapted. In the example embodiment, the display objects 32 can be for example illustrations or representations of virtual meteorites which fit in with the example theme or story of the virtual reality in respect of content.

In other words, FIG. 10 schematically shows the reference navigation route 28 in its depiction as a virtual navigation route of the virtual reality and illustrates those points of the virtual navigation route at which the route sections 30' of the navigation route 30 cannot be adapted, that is to say the corresponding route section of the reference navigation route 28 cannot be synchronized. The virtual reality can be "filled" by incorporating the display objects 32. In other words, the display content of the virtual reality can be "filled" with display objects 32, for example in the event of an override of the vehicle movement of the second motor vehicle 22 at for example connection pieces of the navigation routes, wherein, when the virtual reality is output, there is no interaction between the ego vehicle and the avatar of the other motor vehicle 22, or the avatar of the other motor vehicle 22 is not visible.

FIG. 11 once again schematically illustrates the process of changing the output content (S12), wherein the connection pieces are each emphasized by a circle, that is to say the intersection points of the navigation routes 28, 30 which are placed one above the other.

The abovementioned method operations or at least the scaling S3 and the defining of route sections as synchronizable route sections S5 can for example be adapted dynamically if one or both of the motor vehicles 20, 22 does not progress as planned on the corresponding navigation route 28, 30. To this end, for example a current speed of the second motor vehicle 22 and/or the first motor vehicle 20 can be established (S13) and, when it is established that for example the second motor vehicle 22 is suddenly traveling more slowly, its navigation route 30 can be rescaled (S3).

In method operation S13 (FIG. 1), the synchronization device 12 can then generate an output signal which describes the changed output content, and this generated output signal can be output to for example both virtual reality output apparatuses in method operation S14.

Overall, the example embodiment illustrates how the method renders possible route/spline matching for multicar use cases for an in-car virtual reality.

According to a further example embodiment, a technical implementation can make provision for a system to be implemented as follows in the following description.

For example, in a first operation (1), matchmaking may be performed: for example two motor vehicles 20, 22 each travel on a navigation route 28, 30 with a similar duration (S1, S2).

In a second operation (2), scaling one of the two navigation routes 28, 30 (S3) may be performed, so that they for example have the same length, in this case the scaling of a three-dimensional navigation route 28, 30 of a game engine can for example be scaled by use of a scaling factor, wherein the example game engine can be realized by the synchronization device 12.

In a third operation (3), analyzing of both routes may be performed for homogenizable route sections (identical route sections for example without a long-term change in direction) (S5).

In a fourth operation (4) cutting of the two navigation routes 28, 30, may be performed, for example by assigning the route sections (S10). Here, the specific navigation route 28, 30 of one player and/or motor vehicle 20, 22 can for example always be the master, that is to say the template, which is not cut, and the navigation route 30, 28 of the co-player can be the client route. For example, the navigation route 30 of the co-player vehicle 22 can be cut such that it can follow the specific navigation route 28 in parallel, and here one or more limit values can for example be used for calculating the intersection points, for example a degree of bending and/or distance between the routes, wherein these limit values can for example be parameterizable; and/or the navigation route 28, 30 can always be cut when an end of a homogenizable (synchronizable) route section 30' of the client route or the master route is reached when the navigation routes 28, 30 are placed one over the other.

In a fifth operation (5), after homogenizing the navigation routes 28, 30, that is to say after the assignment S10, display objects 32 can be placed in the virtual world such that neither the master nor the client route cut them.

In a sixth operation (6), the homogenization or assignment S10 can take place on both motor vehicles 20, 22, but the ego motor vehicle 20, 22 can for example always be the master, that is to say the template, here.

In a seventh operation (7), as a result, levels can for example be created on both motor vehicles 20, 22, which levels differ on the basis of the different masters, but can be played "together" on account of the mutual homogenization (assignment S10). In other words this means that the players each see the avatar which represents the other player.

In an eighth operation (8), at intersection points (according to the fourth operation (4) described above), a motor vehicle movement of the client vehicle 22 in the virtual reality cannot correspond to the movement of the real vehicle, that is to say of the first motor vehicle 20, in live operation since rotations in the route profile can be generated by the cut. In order to not generate any breaks in the experienced game as a result, display objects 32 can be inserted into the virtual reality at the intersection points (illustrated by the black bars), which display objects that prevent the players from seeing each other (visual separation).

Aspects of the disclosure described herein show a concept with which multiplayer concepts can be realized even though the motor vehicles 20, 22 are not physically traveling on the same route or navigation route 28, 30. To this end, a function of the navigation routes 28, 30 and the matching of the virtual world take place.

A description has been provided with reference to various examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method for operating a virtual reality output device assigned to a first motor vehicle, the method comprising:
    establishing a planned navigation route of the first motor vehicle as a reference navigation route;
    selecting a second motor vehicle according to a planned navigation route of the second motor vehicle satisfying a prespecified synchronization condition, the prespecified synchronization condition specifying that a duration of travel of the second motor vehicle on a navigation route of the second motor vehicle lies within a prespecified tolerance range around a reference journey duration of travel of the first motor vehicle on the reference navigation route;
    scaling a route length of the navigation route of the second motor vehicle to a route length of the reference navigation route to form a scaled navigation route;
    identifying a route section of the reference navigation route satisfying a prespecified homogeneity criterion, as a synchronizable route section, the prespecified homogeneity criterion specifying a prespecified minimum degree of correspondence of a route profile of the route section of the reference navigation route with a route profile of a route section of the scaled navigation route;
    assigning the route section of the scaled navigation route to the synchronizable route section;
    providing an output content, which describes a virtual journey on a virtual navigation route, the virtual journey representing the reference journey duration and a route profile of the reference navigation route, for output by the virtual reality output device during travel of the first motor vehicle; and
    when the first motor vehicle is on the synchronizable route section and the second motor vehicle is on the route section of the scaled navigation route assigned to the synchronizable route section, changing the output content provided for output by the virtual reality output device, the changed output content describing an avatar which represents the second motor vehicle and a recorded motor vehicle movement of the second motor vehicle.

2. The method according to claim 1, further comprising:
    identifying a plurality of synchronizable route sections from route sections of the reference navigation route; and
    assigning a plurality of route sections from the scaled navigation route to respective synchronizable route sections among the plurality of synchronizable route sections,
    wherein
    a sequence of the route sections of the scaled navigation route assigned to the respective synchronizable route sections, corresponds to a sequence of the route sections of the reference navigation route identified as synchronizable route sections.

3. The method according to claim 1, wherein at least one of the scaling the route length of the navigation route of the second motor vehicle or the identifying the route section of the reference navigation route, is performed before a beginning of travel of the first motor vehicle.

4. The method according to claim 1, further comprising:
    establishing a change in speed of at least one of the first motor vehicle or the second motor vehicle, and
    wherein scaling the route length of the navigation route of the second motor vehicle is performed in response to the established change in speed of the at least one of the first motor vehicle or the second motor vehicle, and
    scaling the route length of the navigation route of the second motor vehicle is based on the established change in speed of the at least one of the first motor vehicle or the second motor vehicle.

5. The method according to claim 1, wherein the synchronizable route section does not exhibit any change in direction and/or does not exhibit a bend.

6. The method according to claim 1, wherein
    the prespecified homogeneity criterion describes a limit value for a degree of bending of the route section of the reference navigation route and the route section of the scaled navigation route, and/or
    the prespecified homogeneity criterion describes a limit value for a distance of the reference navigation route and the scaled navigation route.

7. The method according to claim 1, further comprising:
when the first motor vehicle is not on a synchronizable route section, changing the output content provided for output by the virtual reality output device to describe a display object which appears to be static or move independently of the recorded motor vehicle movement of the second motor vehicle.

8. A synchronization device, comprising:
    a memory configured to store instructions; and
    a processor configured to execute the instructions stored in the memory to:
        establish a planned navigation route of a first motor vehicle as a reference navigation route,
        select a second motor vehicle according to a planned navigation route of the second motor vehicle satisfying a prespecified synchronization condition, the prespecified synchronization condition specifying that a duration of travel of the second motor vehicle on a navigation route of the second motor vehicle lies within a prespecified tolerance range around a reference journey duration of travel of the first motor vehicle on the reference navigation route, scale a route length of the navigation route of the second motor vehicle to a route length of the reference navigation route to form a scaled navigation route, identify a route section of the reference navigation route satisfying a prespecified homogeneity criterion, as a synchronizable route section, the prespecified homogeneity criterion specifying a prespecified minimum degree of correspondence of a route profile of the route section of the reference navigation route with a route profile of a route section of the scaled navigation route, assign the route section of the scaled navigation route to the synchronizable route section, provide an output content, which describes a virtual journey on a virtual navigation route, the virtual journey representing the reference journey duration and a route profile of the reference navigation route, for output by a virtual reality output device during travel of the first motor vehicle, and when the first motor vehicle is on the synchronizable route section and the second motor vehicle is on the route section of the scaled navigation route assigned to the synchronizable route section, change the output content provided for output by the virtual reality output device, the changed output content describing an avatar which represents the second motor vehicle and a recorded motor vehicle movement of the second motor vehicle.

9. The synchronization device according to claim 8, wherein the processor is further configured to execute the instructions stored in the memory to:

identify a plurality of synchronizable route sections from route sections of the reference navigation route, and assign a plurality of route sections from the scaled navigation route to respective synchronizable route sections among the plurality of synchronizable route sections, wherein a sequence of the route sections of the scaled navigation route assigned to the respective synchronizable route sections, corresponds to a sequence of the route sections of the reference navigation route identified as synchronizable route sections.

10. The synchronization device according to claim 8, wherein the processor is further configured to execute the instructions stored in the memory to scale the route length of the navigation route of the second motor vehicle before a beginning of travel of the first motor vehicle and/or identify the route section of the reference navigation route before a beginning of travel of the first motor vehicle.

11. The synchronization device according to claim 8, wherein the processor is further configured to execute the instructions stored in the memory to:

establish a change in speed of at least one of the first motor vehicle or the second motor vehicle, scale the route length of the navigation route of the second motor vehicle in response to the established change in speed of the at least one of the first motor vehicle or the second motor vehicle, and scale the route length of the navigation route of the second motor vehicle based on the established change in speed of the at least one of the first motor vehicle or the second motor vehicle.

12. The synchronization device according to claim 8, wherein the synchronizable route section does not exhibit any change in direction and/or does not exhibit a bend.

13. The synchronization device according to claim 8, wherein the prespecified homogeneity criterion describes a limit value for a degree of bending of the route section of the reference navigation route and the route section of the scaled navigation route, and/or the prespecified homogeneity criterion describes a limit value for a distance of the reference navigation route and the scaled navigation route.

14. The synchronization device according to claim 8, wherein the processor is further configured to execute the instructions stored in the memory to: when the first motor vehicle is not on a synchronizable route section, change the output content provided for output by the virtual reality output device to describe a display object which appears to be static or move independently of the recorded motor vehicle movement of the second motor vehicle.

15. A motor vehicle, comprising:
a chassis; and
the synchronization device according to claim 8.

16. A virtual reality output device, comprising:
a display device configured to display content; and
the synchronization device according to claim 8.

17. A data server device, comprising:
the synchronization device according to claim 8; and
a communication device configured to wirelessly exchange data with at least one of the first motor vehicle or the second motor vehicle.

* * * * *